(12) United States Patent
Stradiot

(10) Patent No.: US 11,490,591 B1
(45) Date of Patent: Nov. 8, 2022

(54) DOME FLAPPER ANIMAL DRINKING POST

(71) Applicant: Michael John Stradiot, Evergreen, CO (US)

(72) Inventor: Michael John Stradiot, Evergreen, CO (US)

(*) Notice: Subject to any disclaimer, the term of this patent is extended or adjusted under 35 U.S.C. 154(b) by 133 days.

(21) Appl. No.: 15/930,367

(22) Filed: May 12, 2020

Related U.S. Application Data

(63) Continuation-in-part of application No. 16/423,703, filed on May 28, 2019.

(51) Int. Cl.
*A01K 7/02* (2006.01)

(52) U.S. Cl.
CPC .................................. *A01K 7/022* (2013.01)

(58) Field of Classification Search
CPC . A01K 7/022; A01K 7/06; A01K 7/02; A01K 7/025; A01K 7/027
See application file for complete search history.

(56) References Cited

U.S. PATENT DOCUMENTS

| | | | | |
|---|---|---|---|---|
| 3,831,558 | A * | 8/1974 | Forbes | A01K 7/06 119/73 |
| 4,813,378 | A * | 3/1989 | Lapp | A01K 7/027 119/73 |
| 2013/0160714 | A1 * | 6/2013 | Forbes | A01K 7/06 119/74 |

FOREIGN PATENT DOCUMENTS

DE             1005310 B *   3/1957   ............... A01K 7/06

* cited by examiner

*Primary Examiner* — Kristen C Hayes
(74) *Attorney, Agent, or Firm* — Scott D. Swanson

(57) ABSTRACT

An intake valve and a drain system are located in the lower portion of a stanchion or outer pipe which is preferably dimensioned so that these structures can be located below the frost line underground so as not to be subject to freezing. The intake valve structure includes a body which fits tightly within the stanchion and which has a central bore which receives, at its uppermost end, the lower end of the conduit. The lower end of the bore can be fitted with a metal fitting and a guide washer. The improvements to the prior art include a second drain over the top of the bowl via indents. A concave collar under the bowl guides the water-carrying pipe. A new flapper has a boot type pressure point and a metal pivot assembly. A new valve is overmolded using a hard plastic interior and a soft plastic top.

20 Claims, 19 Drawing Sheets

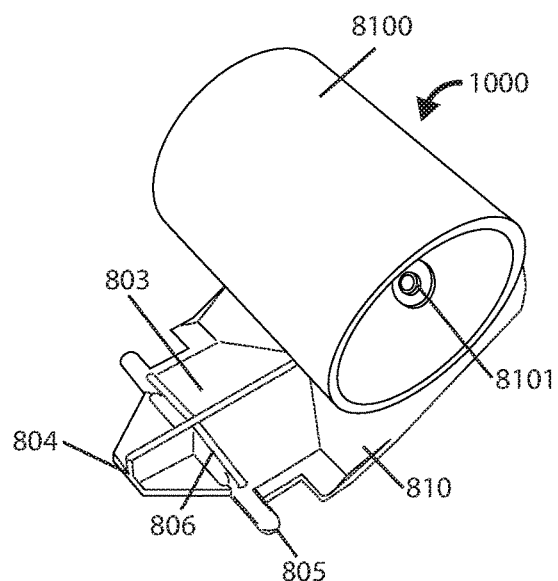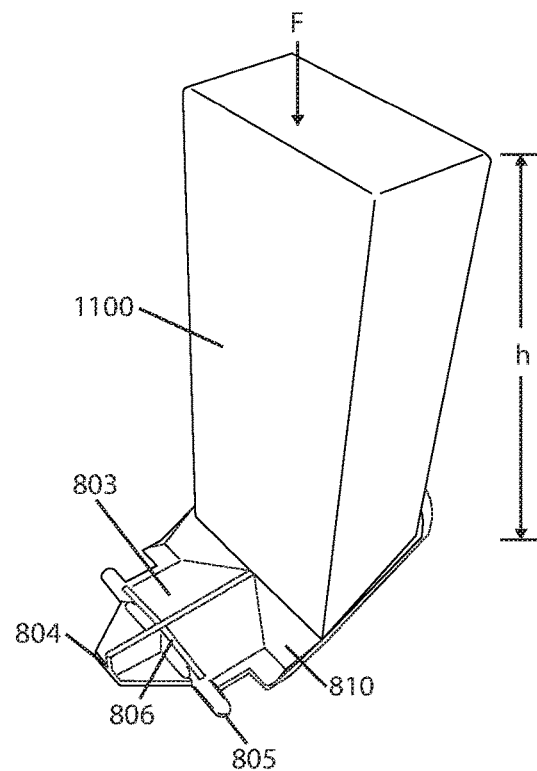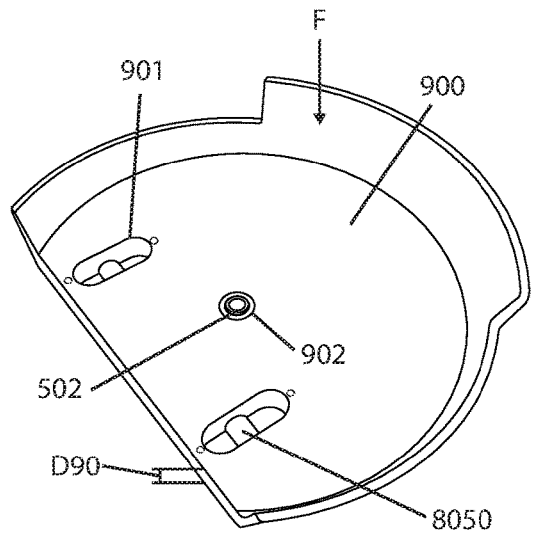

DOME FLAPPER ANIMAL DRINKING POST

CROSS REFERENCE PATENT APPLICATIONS

This non-provisional application is a continuation in part of U.S. patent application Ser. No. 16/423,703, filed May 28, 2019.

THE FIELD OF THE PRESENT INVENTION

The present invention relates to improvements to a prior art animal watering fountain disclosed in U.S. Pat. No. 3,831,558 to Alden O. Forbes issued Aug. 27, 1974 as well as improvements to co-pending U.S. patent application Ser. No. 16/423,703.

BACKGROUND

U.S. Pat. No. 3,831,558 improved the domestic animal trough by providing an elevated drinking fountain that a horse could learn to trigger. The '558 device was comprised of a PVC pipe standing about four feet high. The base was buried several feet below the frost line. Preferably a leech field was formed under the pipe using gravel. FIGS. 1 and 2 herein disclose the '558 invention. Advantages over the prior art trough included no algae since it uses (city) water released by the animal's nose into a bowl which drains after use, no electricity, ease of installation, no cement pad, and freeze prevention includes placing water line and release valve below frost line.

However, problems included drain water covering the release valve causing drainage blockage and freezing at the bowl, difficulty removing and re-installing the valve assembly conduit after maintenance onto the underground (two to seven feet feet) water line threads, and broken flappers.

The present invention solves these problems of the '558 patent.

SUMMARY OF THE INVENTION

The main aspect of the present invention is to provide a stand at the base of the PVC outer pipe which the (city) water outlet is substantially supported above the leech field.

Another aspect of the present invention is to provide an embodiment that provides an elevated crossbar to stabilize the city water outlet above the leech fields.

Another aspect of the present invention is to provide an embodiment of a lower block that stabilizes the city water outlet centrally in the PVC pipe.

Another aspect of the present invention is to add ribs inside the bowl to facilitate unscrewing the valve conduit assembly.

Another aspect of the present invention is to redesign and strengthen the flapper.

Another aspect of the present invention is to offer training flapper embodiments.

Another aspect of the present invention is to provide a dome on a flapper to facilitate training the horse. Another aspect of the present invention is to provide an improved pivot assembly for the flapper to reduce a risk of breaking.

Another aspect of the present invention is to provide a bottom of the bowl drainage and an over top of the bowl drainage to reduce a pooling of water adjacent the drinking fountain.

Another aspect of the present invention is to improve the valve assembly to have only one moving valve body secured by the inlet pipe.

Other aspects of this invention will appear from the following description and appended claims, reference being made to the accompanying drawings forming a part of this specification wherein like reference characters designate corresponding parts in the several views.

In operation the same installation hole is dug. An elbow is installed to lift the (city) water exit port, a male threaded pipe, about six to twelve inches above the bottom of the PVC outer pipe. A stand with a central pipe guide is placed over the (city) water exit port. This presents drain water from surrounding the (city) water valve at the bottom of the valve conduit assembly. This stand also facilitates an easy re-threading of the bottom of the valve conduit assembly onto the (city) water threaded outlet pipe. Improved training paddles and short nosed animal paddles are provided.

The dome flapper is very resistant to breaking. The two of three-drain drainage eliminates pooling water around the drinking fountain.

Valve Updates:
    Rod to hold assembly together
        Much stronger
        Much faster to assemble
        Can disassemble and reassemble for service
        It is not possible to push on the paddle so hard the intake filter is moved out of place
    Contour and shape of drain area and holes
        Holes larger to allow for larger debris
        Sloped downward to promote good drainage
    Design plate allows ability to convert to metal threads Mushroom/Rubber Seal Updates:
    Hard inner core (Shore 80A-Shore 100A) with a softer material (Shore 20A-Shore 70A) overmolded over it
    Had issues with finding the right material that was strong/hard enough to have the strength we needed, but still soft enough to seal the water seal for the valve Bowl Updates:
    Scallops on outer edge to allow water to drain over top of bowl and down the inside of the outer sleeve without water hitting the ground
    Raised saddles (1712 and 1713 of FIG. 17B) 0.5 inches off the bottom of the bowl to better handle slush and ice conditions Flapper Updates:
    Set screw (1720 of FIG. 17A) to allow users to adjust the setting of the flapper based on seasonal or other needs
    Angle of this paddle comes directly up from the hinge points. Simultaneously we have a fin that protrudes on the bottom of the paddle to activate the rod, while keeping the main surface area of the paddle away from and out of the bottom of the bowl. This dramatically helps function when dealing with snowy, slushy, icy conditions.
    Angle of paddle also makes it easier to activate waterer
    Snap on training attachment (1402 of FIG. 17A) allows for a quick an easy attachment to use for training and/or smaller animals (sheep, goat, etc)

BRIEF DESCRIPTION OF THE DRAWINGS

FIG. 9 is a top perspective view of an improved paddle.

FIG. 10 is a top perspective view of a training paddle.

FIG. 11 is a top perspective view of a paddle for short nosed animals such as sheep.

Before explaining the disclosed embodiments in detail, it is to be understood that the embodiments are not limited in application to the details of the particular arrangements shown, since other embodiments are possible. Also, the terminology used herein is for the purpose of description and not of limitation.

DETAILED DESCRIPTION OF THE DRAWINGS

Figure 1:
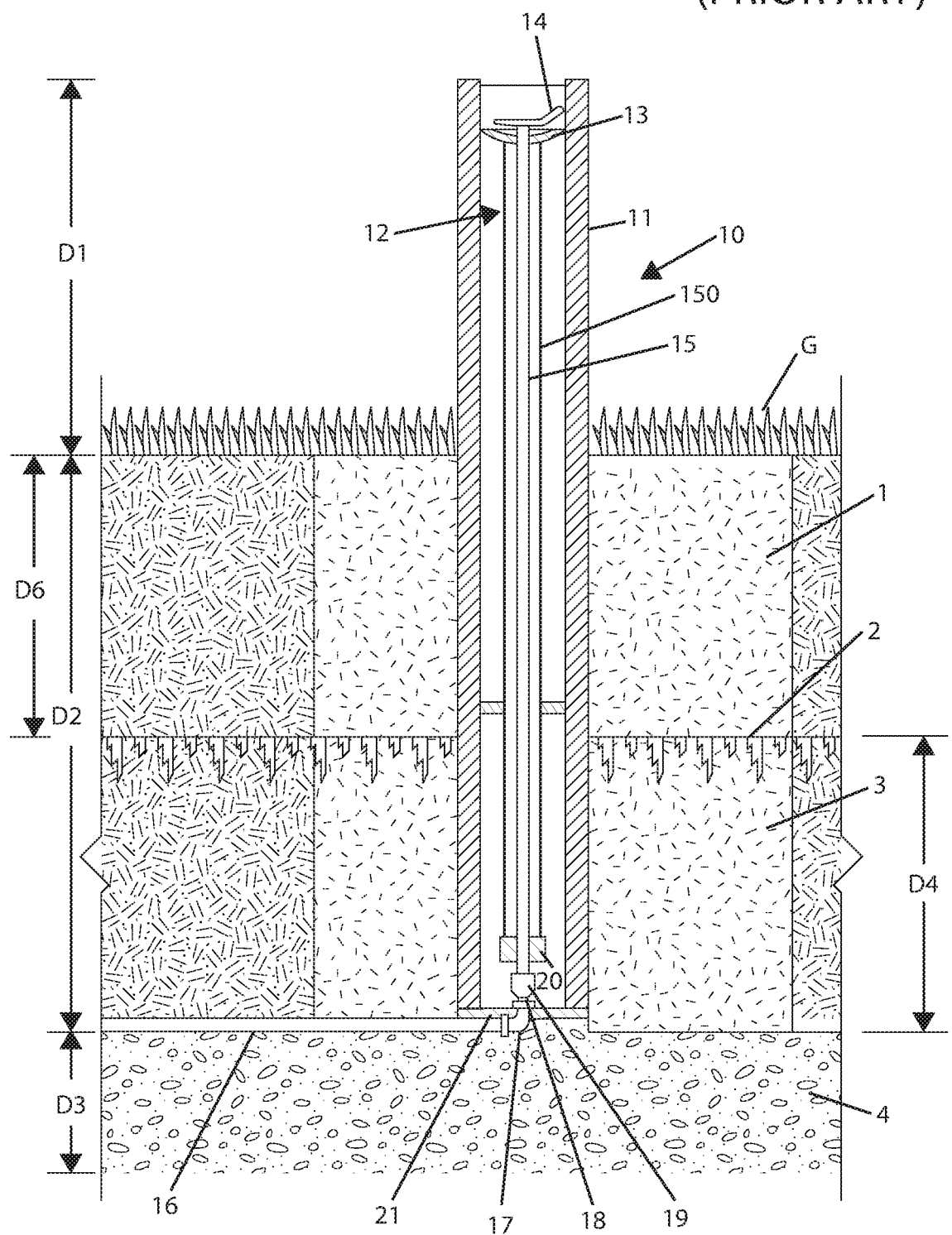
FIG. 1 (prior art) is a sectional view of the invention of U.S. Pat. No. 3,831,558 installed below the frost line.
Figure 2:
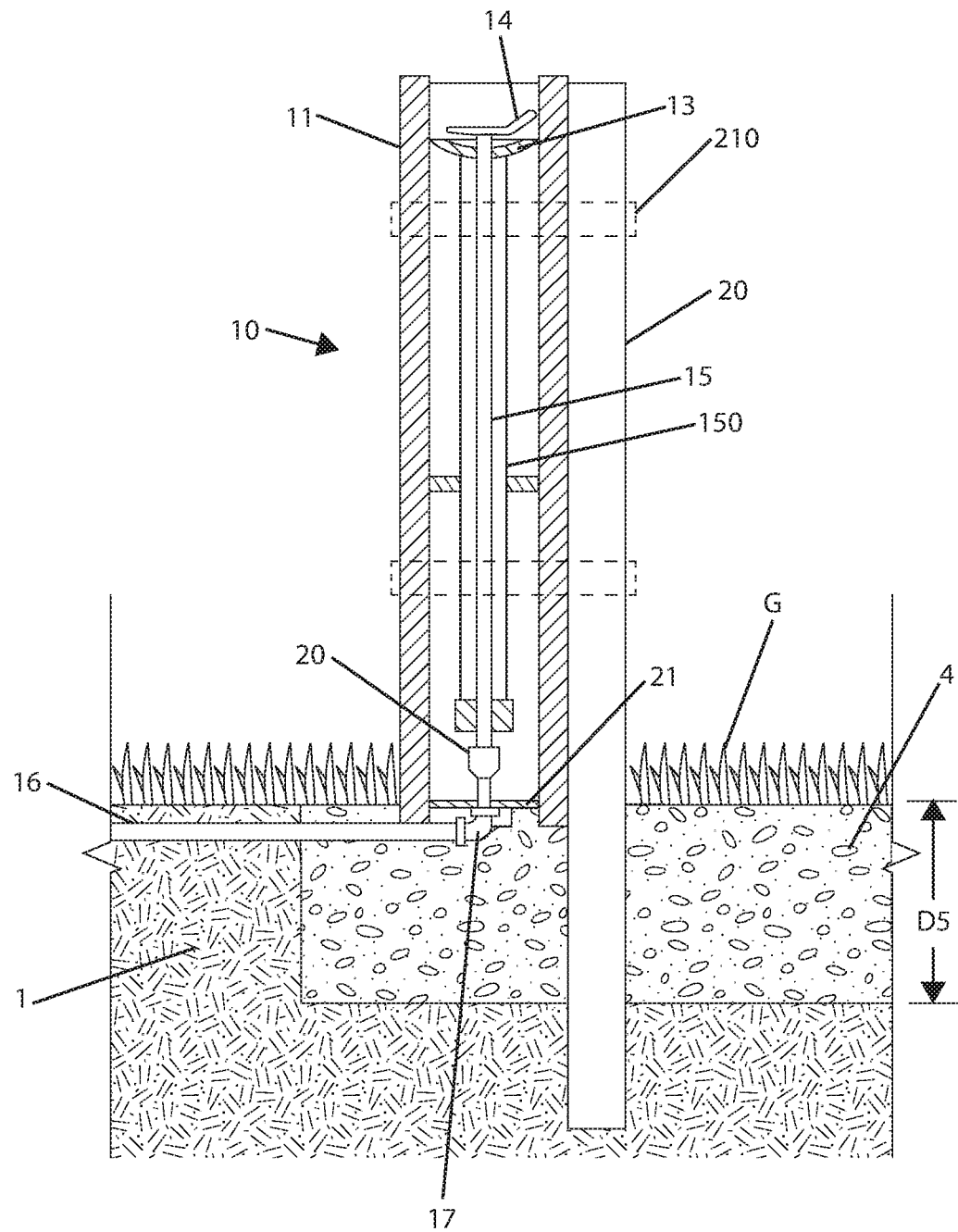
FIG. 2 (prior art) is a sectional view of the invention of '558 installed for warm weather only use.

Referring first to FIGS. 1,2 topsoil layer 1 may have grass G. based on geography a frost line 2 exists a distance D6 below the surface. Topsoil layer 3 is dug a distance D4 (at least 18 inches) below the frost line 2. A leech field (gravel) 4 is preferably laid under topsoil layer 3 to drain away the spillage from the fountain 10. Nominal dimensions are D1=1-3 feet, D2=3-7 feet, D3=1 foot, D4=at least 18 inches, D6=at least 18 inches.

The fountain 10 has an outer (PVC) pipe 11. The valve assembly 12 comprises a bowl 13, paddle 14, and a conduit 15 that sends the water from (city) water pipe 16 to the bowl 13. At the base of outer pipe 11 is a (city) water elbow 17, a (city) water male threaded outlet port 18, and a female threaded inlet 19 in a housing 20. When the valve assembly 12 is removed for maintenance, the conduit 15 is rotated which unscrews the female threaded inlet 19 from the male threaded outlet port 18. Lower plate 21 allows the outlet port 18 to wobble. Thus, it is difficult to reinstall the female threaded inlet 19 onto the male threaded outlet port 18. Also ground water and spillage can linger over the threaded outlet port 18. This can cause a drainage blockage above the frost line 2 which can result in water freezing and damage or more spillage.

In FIG. 2 a summer only installation is shown. A support post 20 with straps 210 helps prevent an animal from dislodging the fountain 10. Nominal dimension D5 could range from 2 to 18 inches.

Figure 3:
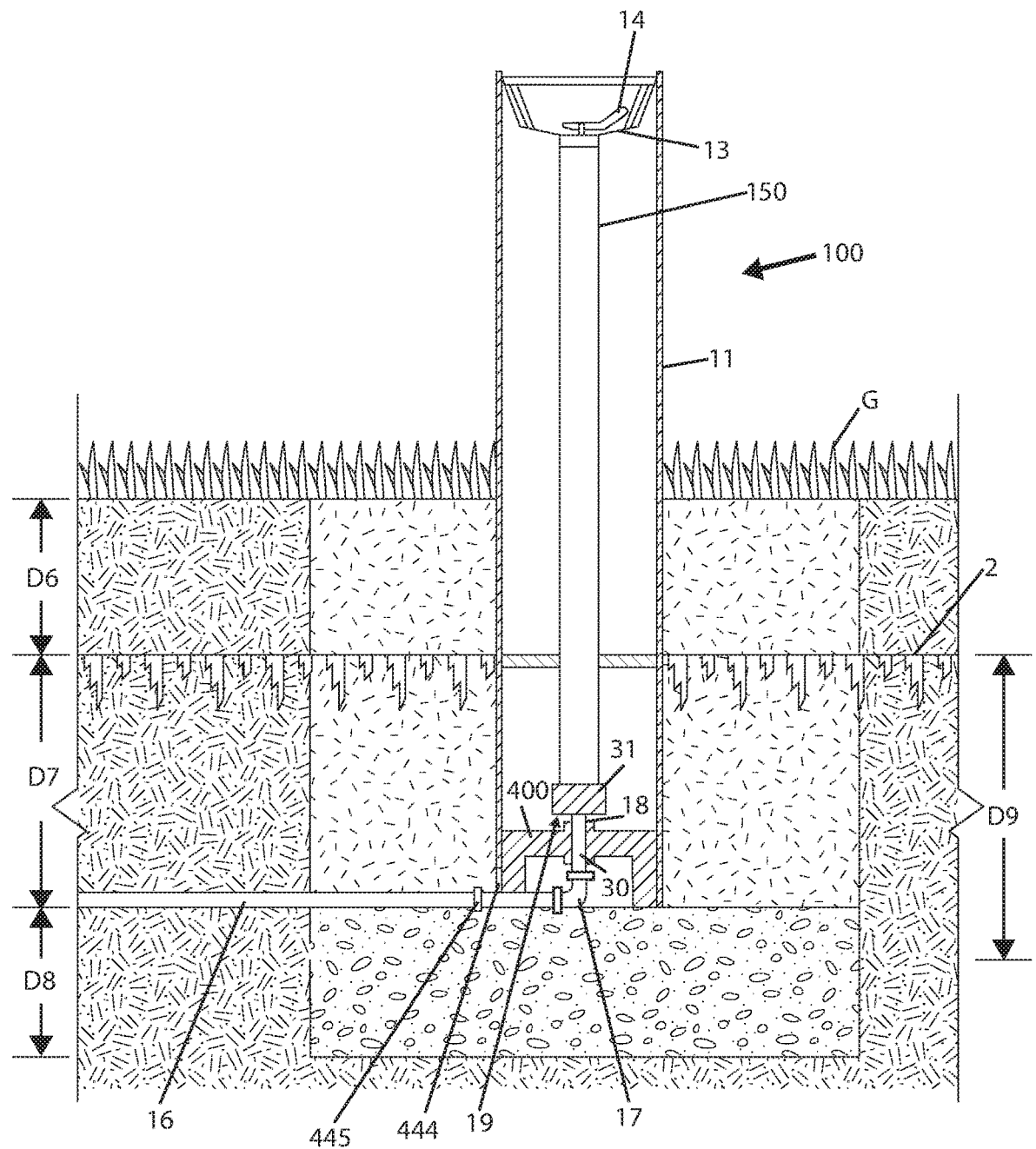
FIG. 3 is a sectional view of the embodiment of the present invention installed below the frost line.

Referring next to FIG. 3 a fountain 100 functions the same as fountain 10. However, the lower valve assembly 31 is now raised at least about two to six inches over the bottom of outer pipe 11. The city water pipe extension 30 has the male threaded outlet port 18. It threads into the female threaded inlet 19. A guide plate 33 has a central hole 34 to stabilize pipe extension 30. Fasteners 35 secure the guide plate 33 to the outer pipe 11. This design helps prevent ground water from settling around lower valve assembly 31, and it stabilizes the male threaded outlet port 18 facilitating maintenance.

Figure 4C:
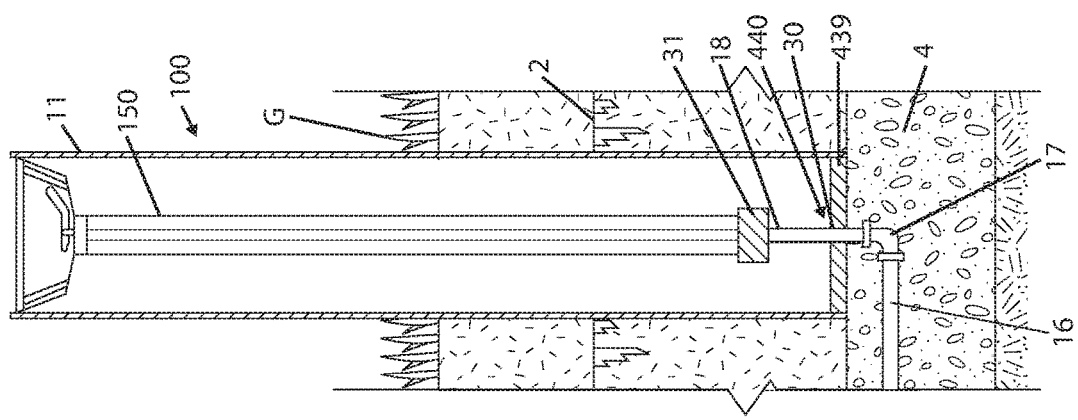
FIG. 4C is a sectional view of the raised pipe with plate embodiment of the present invention.
Figure 4B:
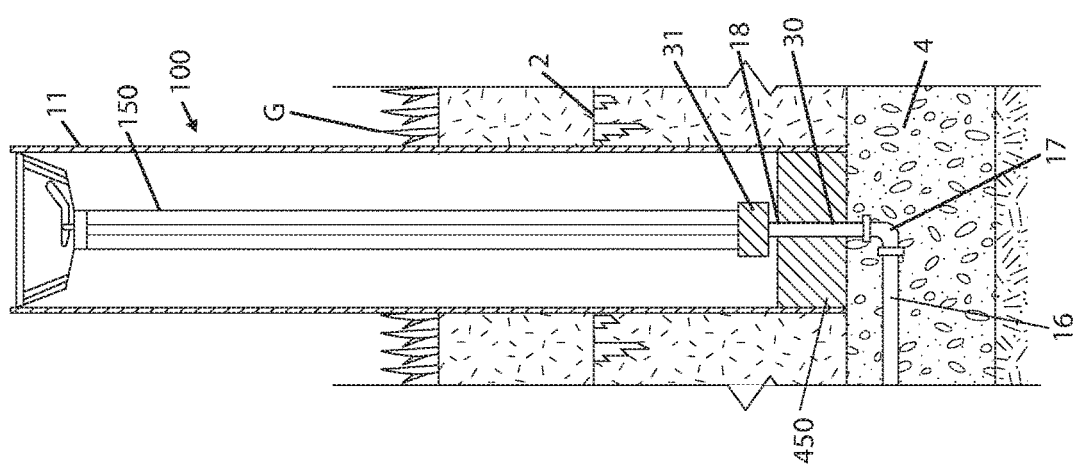
FIG. 4B is a sectional view of the block embodiment of the present invention.
Figure 4A:
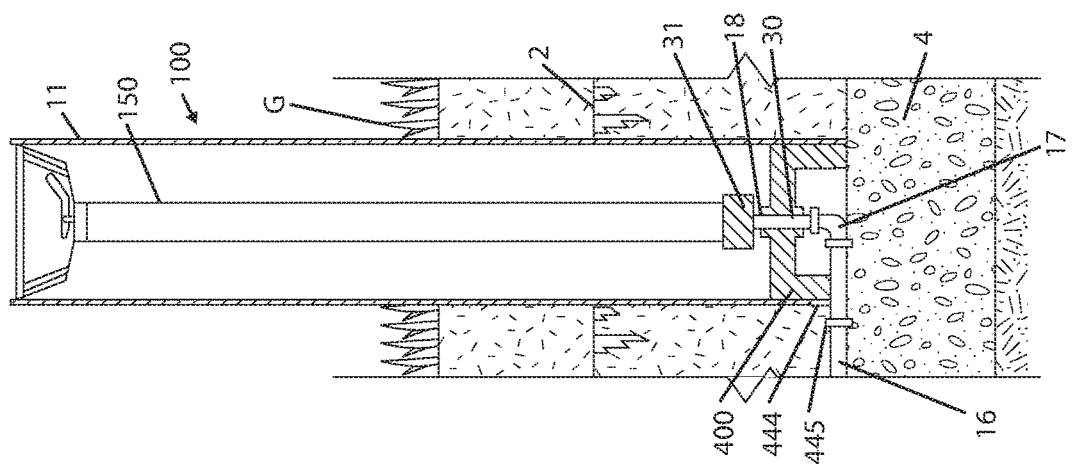
FIG. 4A is a sectional view of the stand embodiment of the present invention.

Referring next to FIG. 4A the lower valve assembly 31 is again raised at least about two to six inches over the bottom of outer pipe 11. The stand 400 has a guide hole 401 for pipe extension 30. See FIGS. 12-15 for details.

Referring next to FIG. 4B the lower valve assembly 31 is again raised at least about two to six inches over the bottom of outer pipe 11. The block 450 has a central hole 451 for extension pipe 30. The block 450 could be made of plastic, wood, cement or the like. It should not rust.

Referring next to FIG. 4C the lower valve assembly 31 is again raised at least about two to six inches over the bottom of outer pipe 11. The plate 439 has central hole 440. However, this is not a preferred embodiment because the male threaded outlet port 18 tends to wobble when the lower valve assembly 31 is attempted to be reinstalled.

Figure 4D:
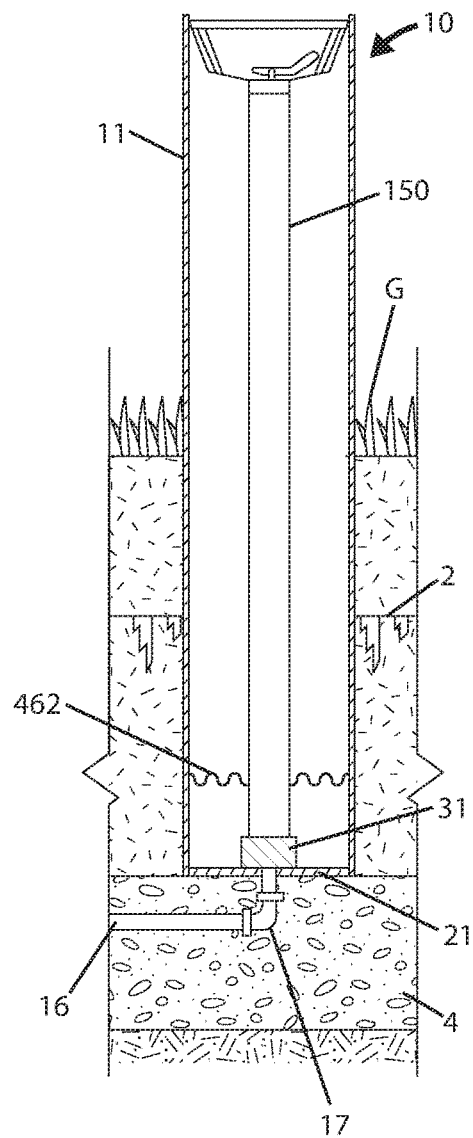
FIG. 4D (prior art) is a sectional view of a low pipe with plate embodiment.

Referring next to FIG. 4D (prior art) the plate 21 is on the bottom of outer pipe 11. The fountain 10 has the lower valve assembly 31 adjacent the plate 21. Ground water 462 has settled over the lower valve assembly 31.

Figure 5:
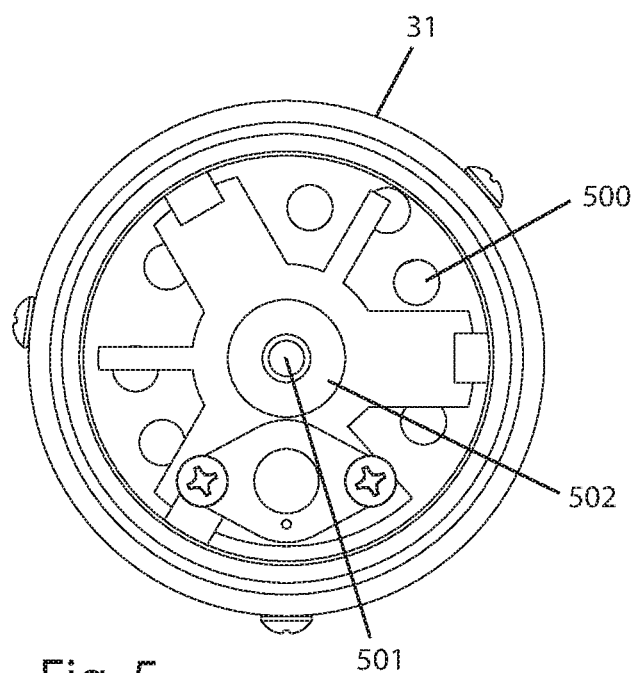
FIG. 5 (prior art) is a top plan view of the valve assembly.
Figure 6:
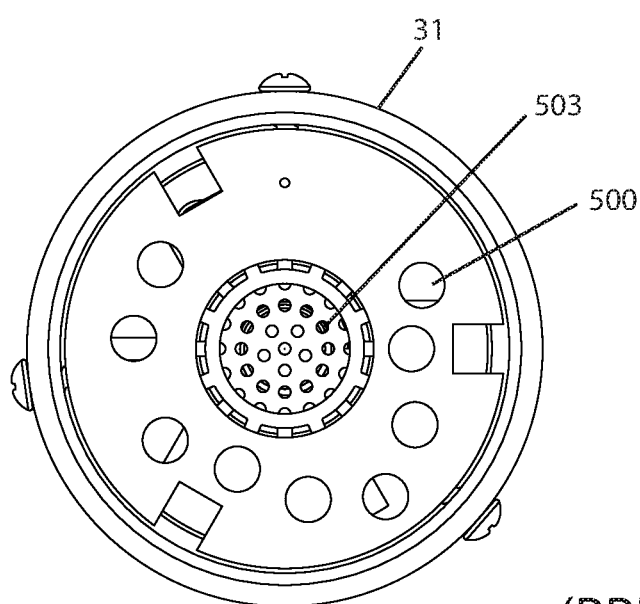
FIG. 6 (prior art) is bottom plan view of the vale assembly.

Referring next to FIG. 5 (prior art) the top plan view of lower valve assembly 31 is shown to have drainage holes 500 for bowl overflow water. The central activation rod 501 is pressed down by flapper 14 to open the valve and release (city) water up conduit 502. In FIG. 6 (prior art) a city water filter 503 can require cleaning.

Figure 7:
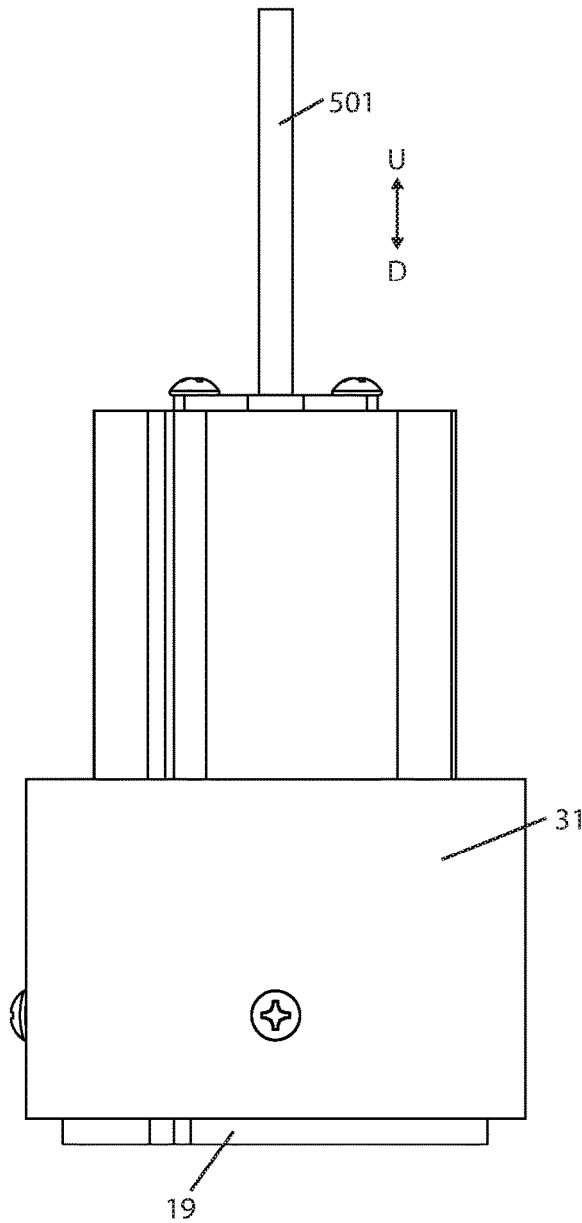
FIG. 7 (prior art) is a side elevation view of the valve assembly.

In FIG. 7 (prior art) the activation rod 501 moves up U and down D.

Figure 8:
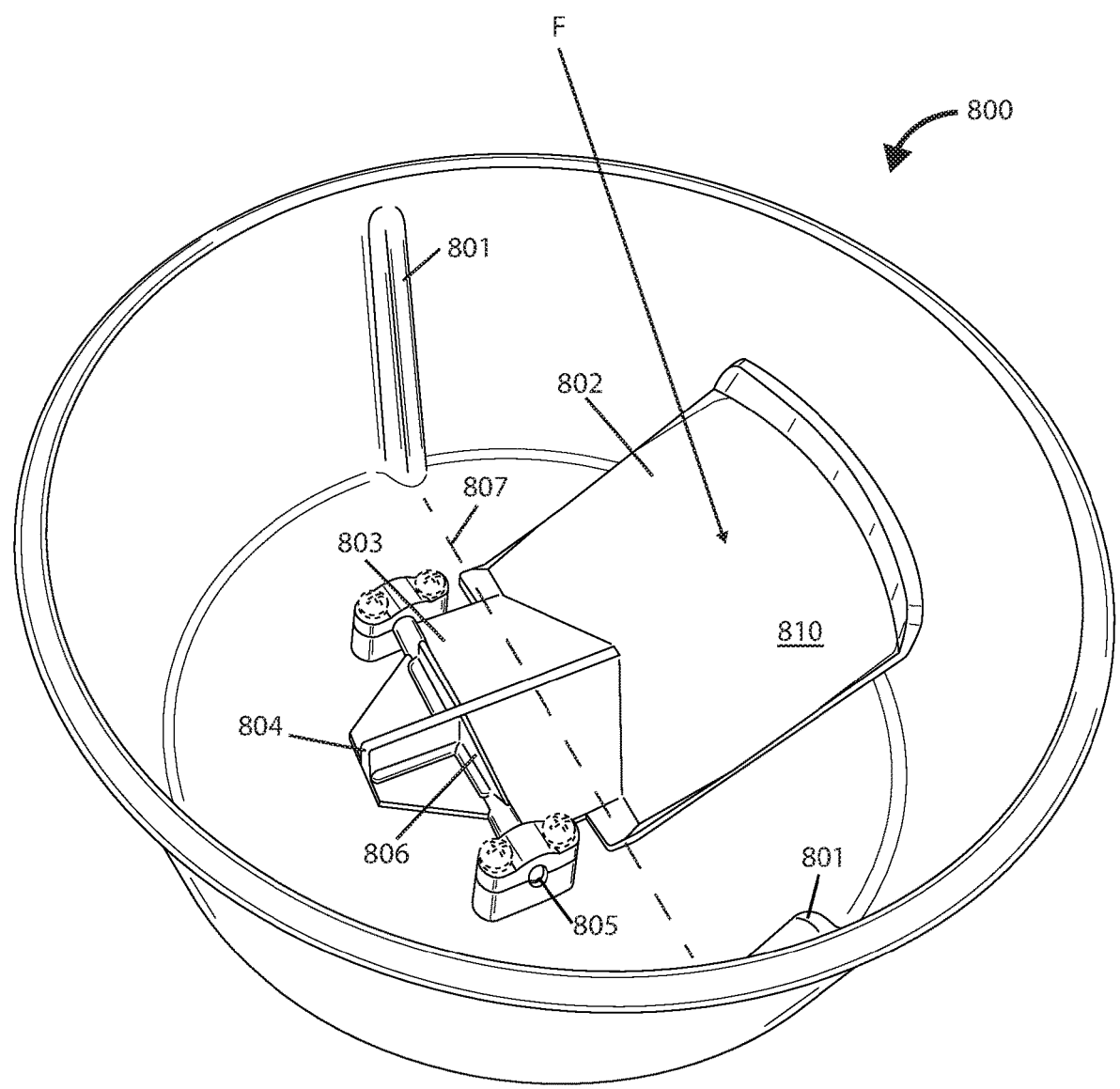
FIG. 8 is a top perspective view of one embodiment bowl and paddle (flapper).
Figure 12:
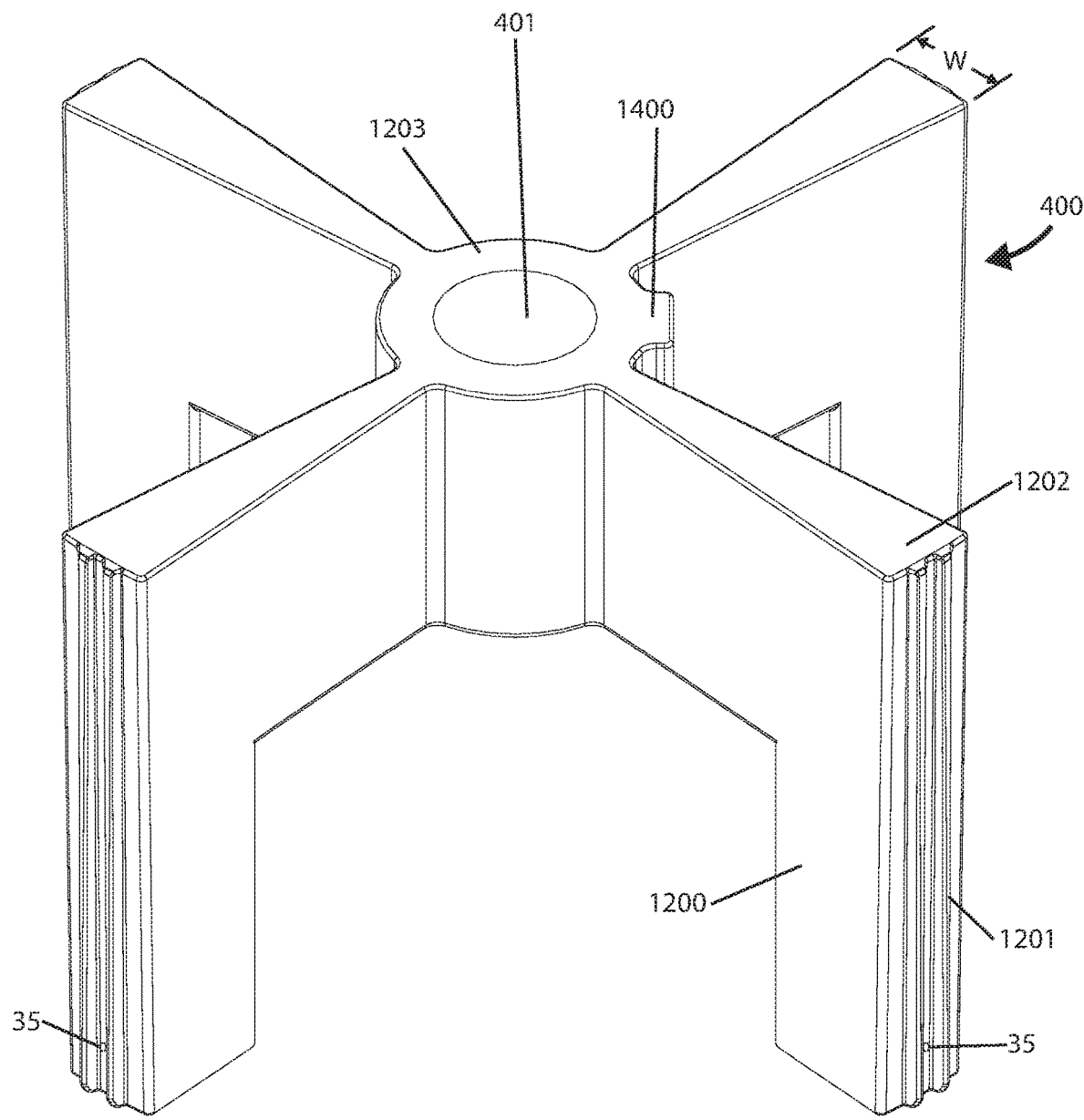
FIG. 12 is a top perspective view of the stand shown in FIG. 4A.
Figure 13:
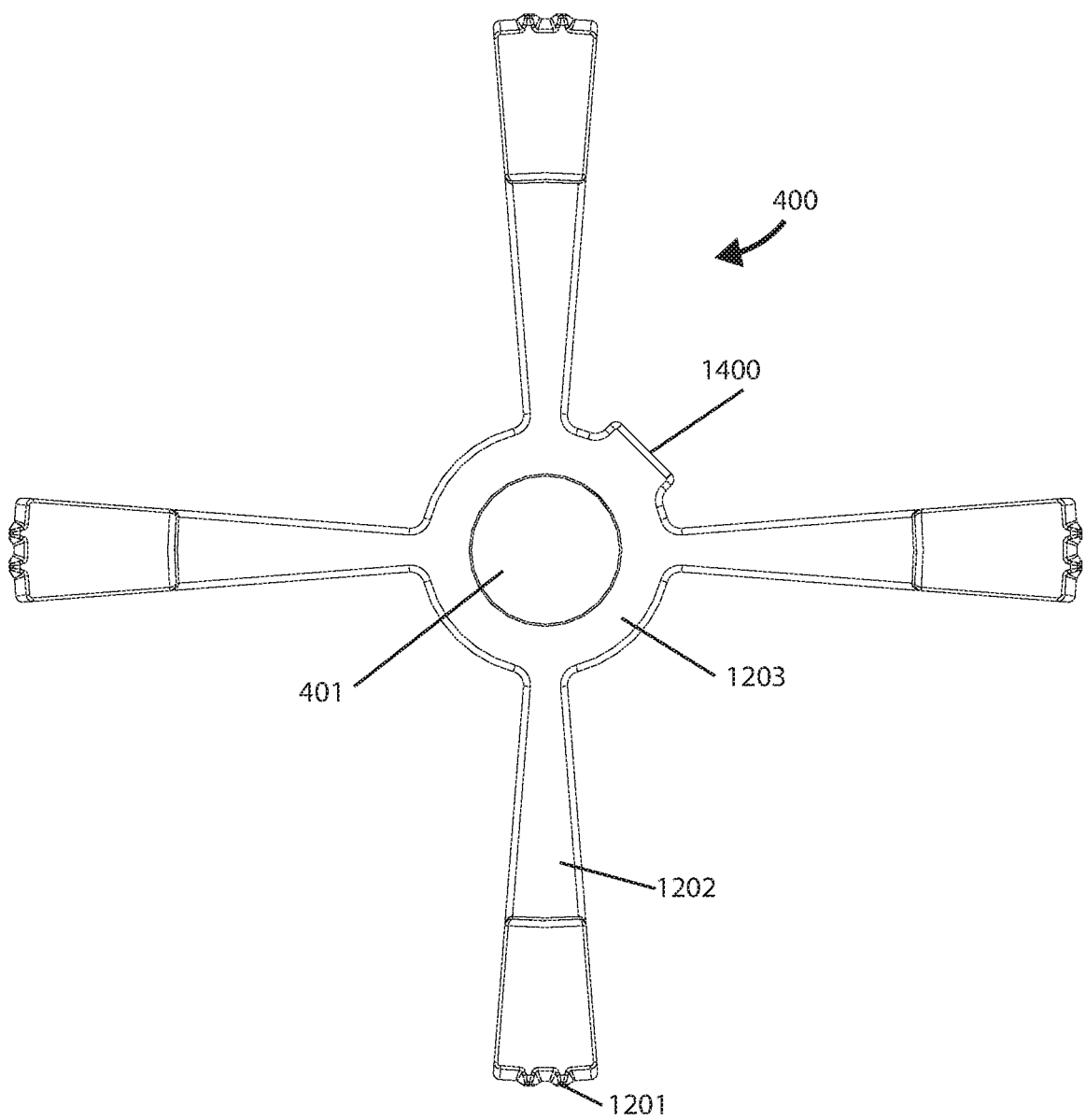
FIG. 13 is a top plan view of the stand shown in FIG. 12.
Figure 14:
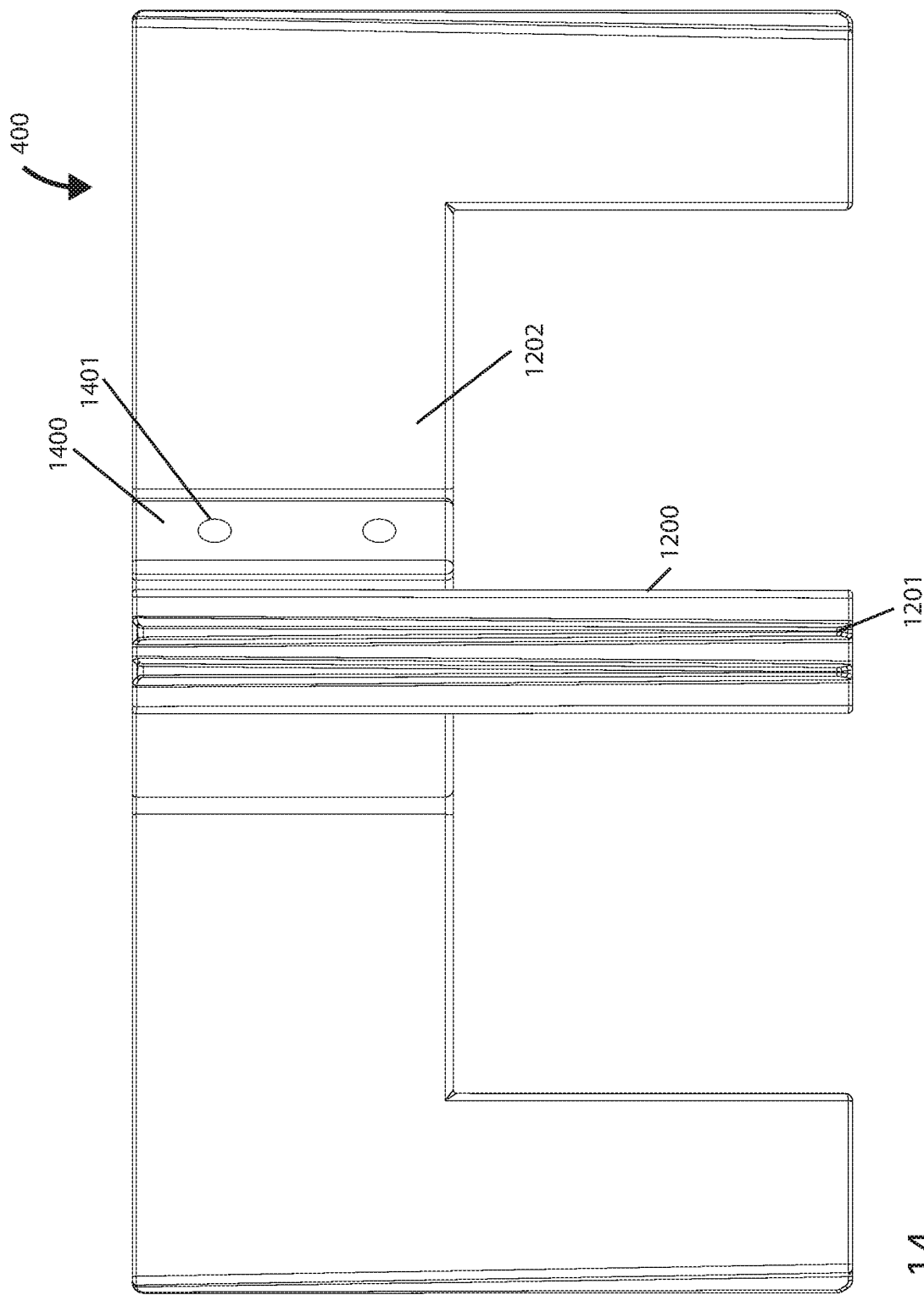
FIG. 14 is a front elevation view of the stand shown in FIG. 12.
Figure 15:
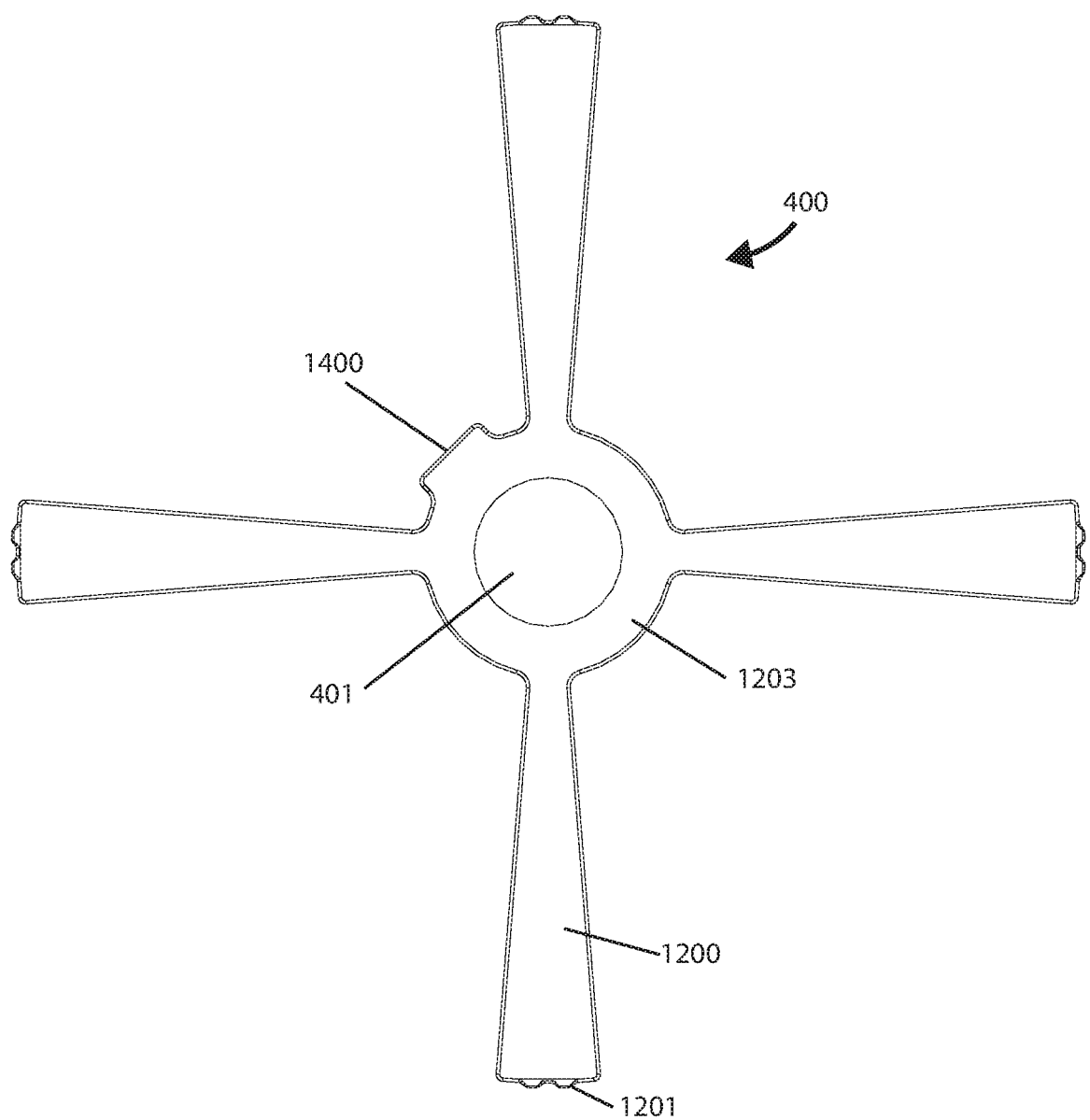
FIG. 15 is a bottom plan view of the stand shown in FIG. 12.

Referring next to FIG. 8 a bowl 800 has inside vertical ribs 801 which help the user to unscrew the valve assembly for maintenance. The flapper 802 is new and non-obvious having a triangular buildup 803 with a maximum thickness centerline 804. The pivot arms 805 and axle 806 are supported by the buildup 803. The joinder line 807 in the prior art flapper was prone to break from the animal's force F on the tongue 810 of the flapper 802. The present embodiment prevents that breakage with buildup 803.

In FIG. 9 the flapper 900 has a thick base with D90=¼ to ⅜ inch. Fixtures 901 hold the pivot arms 8050. The rod 501 is depressed by metal fitting 502 in hole 902. In all embodiments the pivot arms could be metal instead of plastic.

Referring next to FIG. 10 a training flapper 1000 has a removable riser 8100 shaped as a cylinder. A nut and bolt 8101 attach the riser 8100 to the tongue 810. The animal gets used to depressing the tongue 810 with less insertion of his nose into the bowl.

Referring next to FIG. 11 the riser 1100 is used to raise the tongue 810 a height h above the bottom of the bowl. This allows sheep, goats or other animals to activate the tongue 810.

Referring next to FIGS. 12-15 the stand 400 is the preferred way to stabilize the male threaded outlet port 18 shown in FIG. 4A. A central hub 1203 forms the hole 401 for the pipe extension 30 shown in FIG. 4A. Support arms 1202 taper outbound to a widest width W. Each leg 1200 has outer ridges 1201 to nest against the inside of outer pipe 11. For installation the pipe extension 30 is mounted above the leech field 4. Next the stand 400 is set onto the pipe extension 30. Next the outer pipe 11 is placed over the stand 400. Next the valve assembly 150 is placed down the outer pipe 11 and screwed onto the male threaded outlet port 18. The hub extension 1400 has mounting holes 1401 used for set screws to secure the extension pipe 30. The FIG. 12 hole 35 is for fastener 35 shown in FIG. 3.

Figure 16:
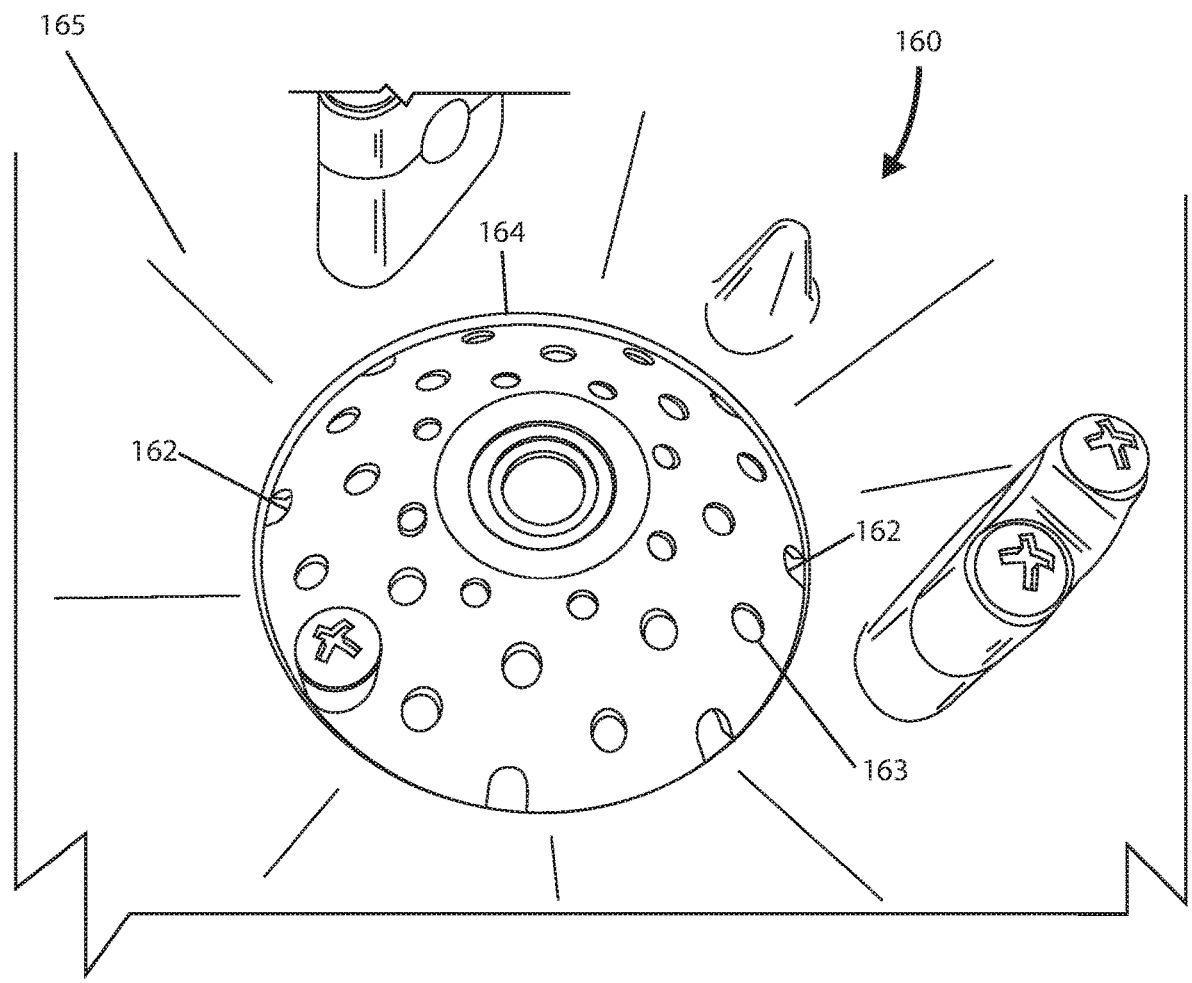
FIG. 16 is a top perspective view of an improved drain filter.

Referring next to FIG. 16 the circular bowl is designated 165. The central drain hole 164 is sized to allow the drain filter 160 to drop slightly below the bottom surface of the bowl. This allows all water to drop down into the peripheral holes 162 of the drain filter 160. Traditional drain holes 163 are also included.

Figure 17A:
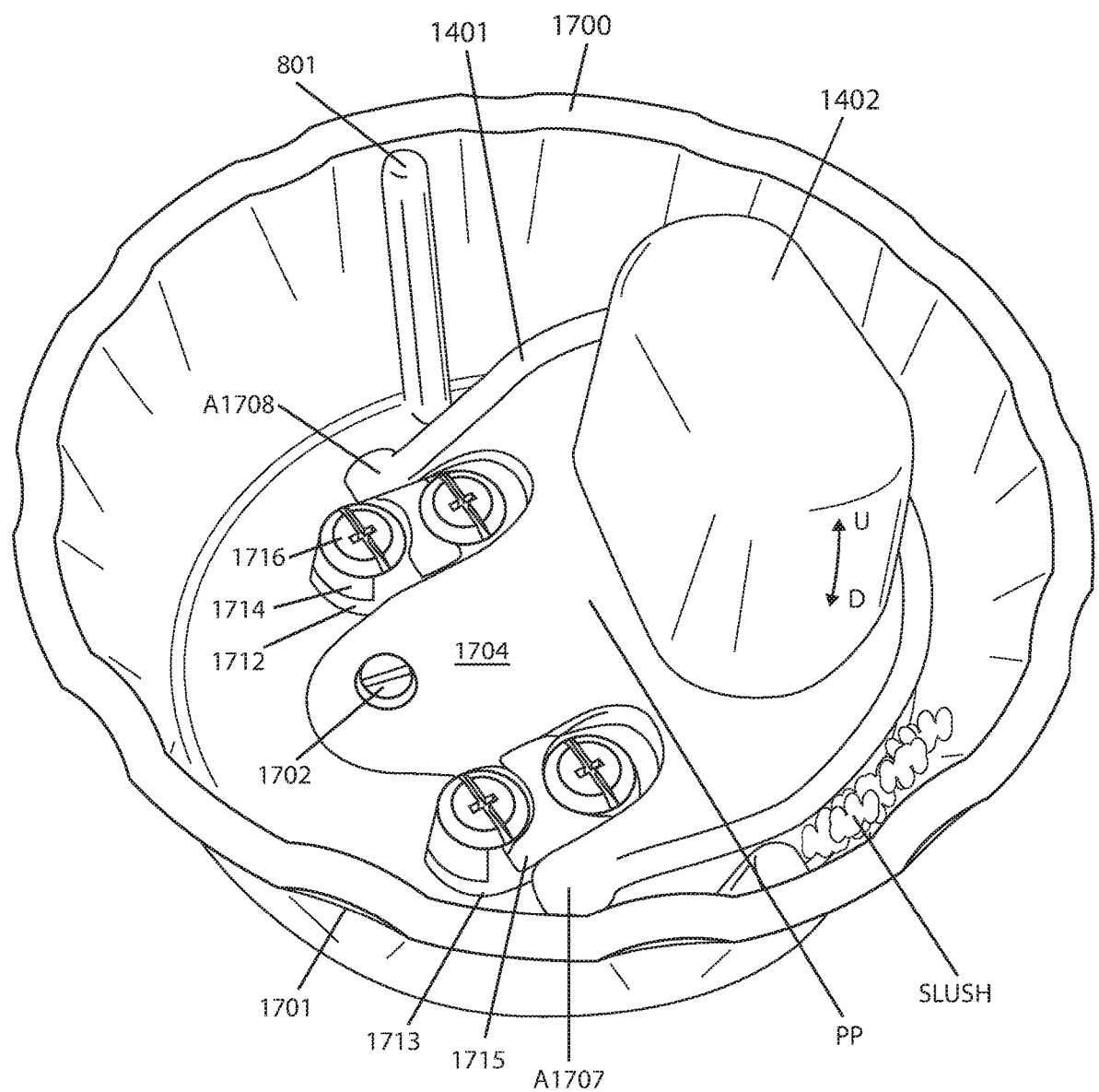
FIG. 17A is a top perspective view of a dome flapper bowl.
Figure 17B:
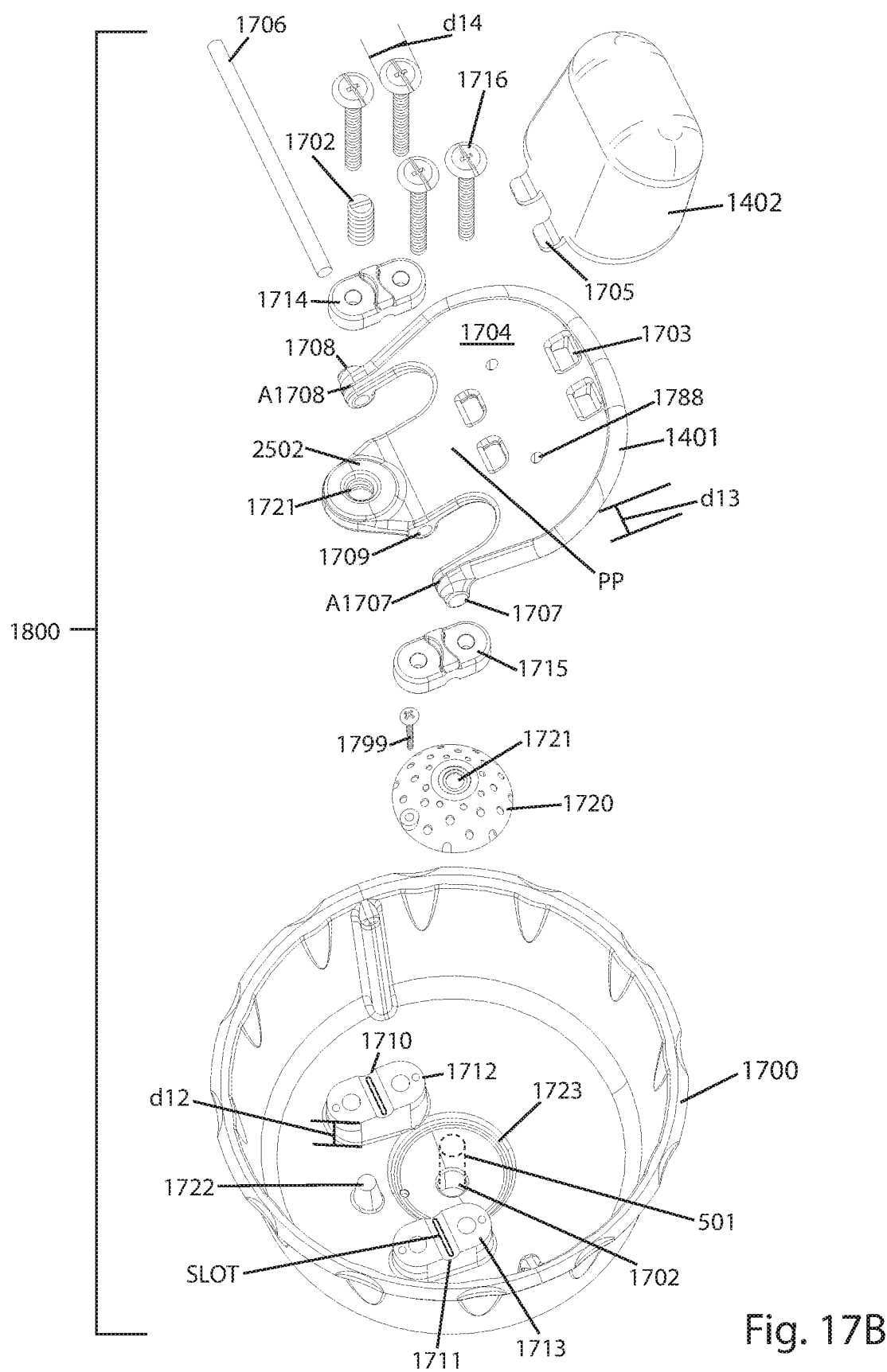
FIG. 17B is an exploded view of the dome flapper bowl.

Referring next to FIGS. 17A, 17B a flapper assembly 1800 includes a bowl 1700 having peripheral upper indents 1701 and vertical ribs 801. The prior art central activation rod 501 extends up through bottom hole 1702. This central activation rod 501 is forced downward at pressure point PP of flapper 1704. The flapper 1704 has a U-shaped ridge 1401. The four receiving clips 1703 secure the four legs 1705 of the dome 1402. A lower valve spring keeps the central activation rod 501 in the up UP and valve closed position. The horse uses his nose to push the dome down D.

The pivot axle 1706 passes thru holes 1707,1708 of the flapper 1704 and the base hole 1709. Then pivot axle 1706 rests in grooves 1710,1711 of landings 1712,1713. Upper landings 1714,1715 are secured to landings 1712,1713 via four bolts 1716. The pivot arms A1707 and A1708 rest outside the landings 1712,1713, thus providing a robust and long lasting pivot assembly. Optional slots SLOT are drain holes out the bottom of the bowl 1700. Threaded drain holes 1788 provide draining as well as a mounting option for other training modules such as seen in FIG. 11.

The height adjustment bolt 1702 threads into base hole 1721 of flapper 1704 tongue 2502. It stops against post 1722. This flapper assembly 1800 functions well even with frozen SLUSH present. Nominal dimension d12=0.5 inch.

A screen 1720 rests in depression 1723. A screw 1799 secures it in place. Hole 1721 receives the central activation rod 501.

Figure 25:
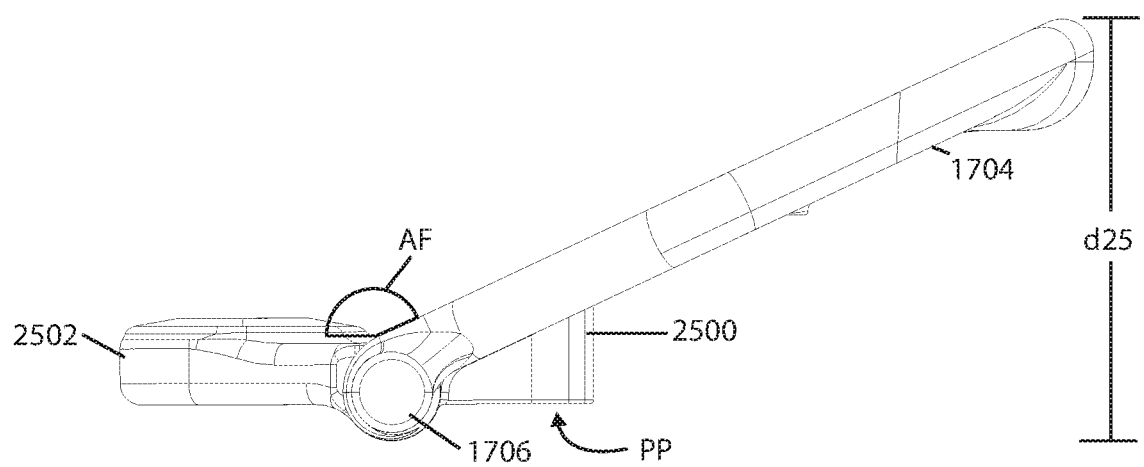
FIG. 25 is a side elevation view of the flapper.

Referring to FIG. 25 angle AF of this paddle 1704 comes directly up from the hinge points 1706. Angle of paddle makes it easier to activate waterer, and AF ranges from about 110° to about 170°. There is a fin 2500 that protrudes on the bottom of the paddle 1704. This dramatically helps function when dealing with snowy, slushy, icy conditions. It also makes the flapper 1704 easier to train animals and activate because it is more prominently placed in the bowl.

Figure 18:
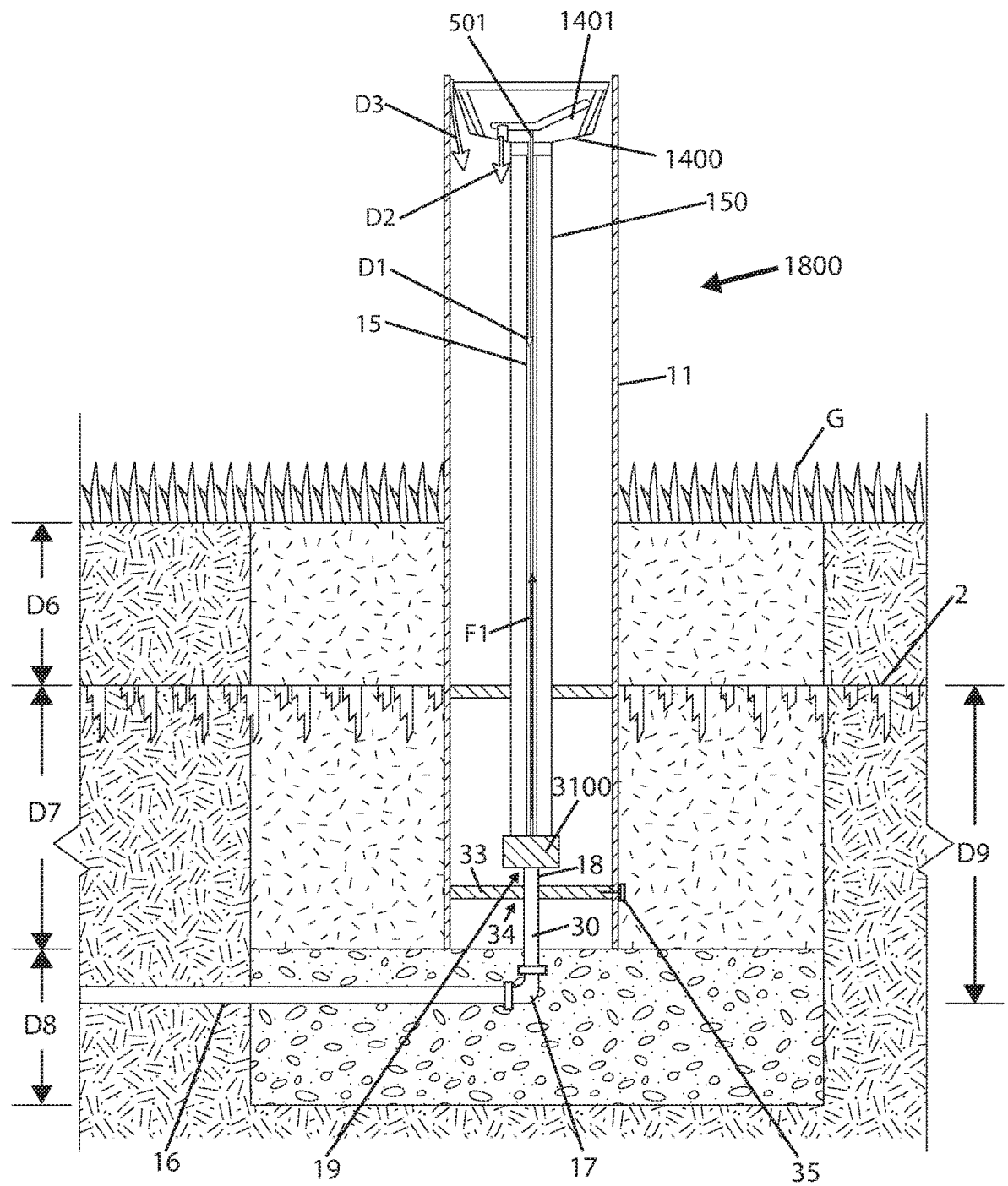
FIG. 18 is a cross sectional view of the drinking fountain with the dome flapper bowl.

Referring next to FIG. 18 when valve 3100 is opened via the flapper 1401, the city water F1 flows up the central pipe 15. The improved drainage consists of water flowing back down central pipe 15 at D1 (prior art) in addition to drain D3 over the bowl 1700 via the indents 1701 shown in FIG. 17A. Optional third drain D2 uses optional drain holes not shown at the bowl bottom.

The optional drainage D2 comes out the bottom of bowl 1700 via the optional slots SLOT shown in FIG. 17B. A third drainage D3 comes out the indents 1701. These three drains D1, D2, D3 prevent pooling and freezing of water on the ground G near the waterer 1800.

Figure 19:
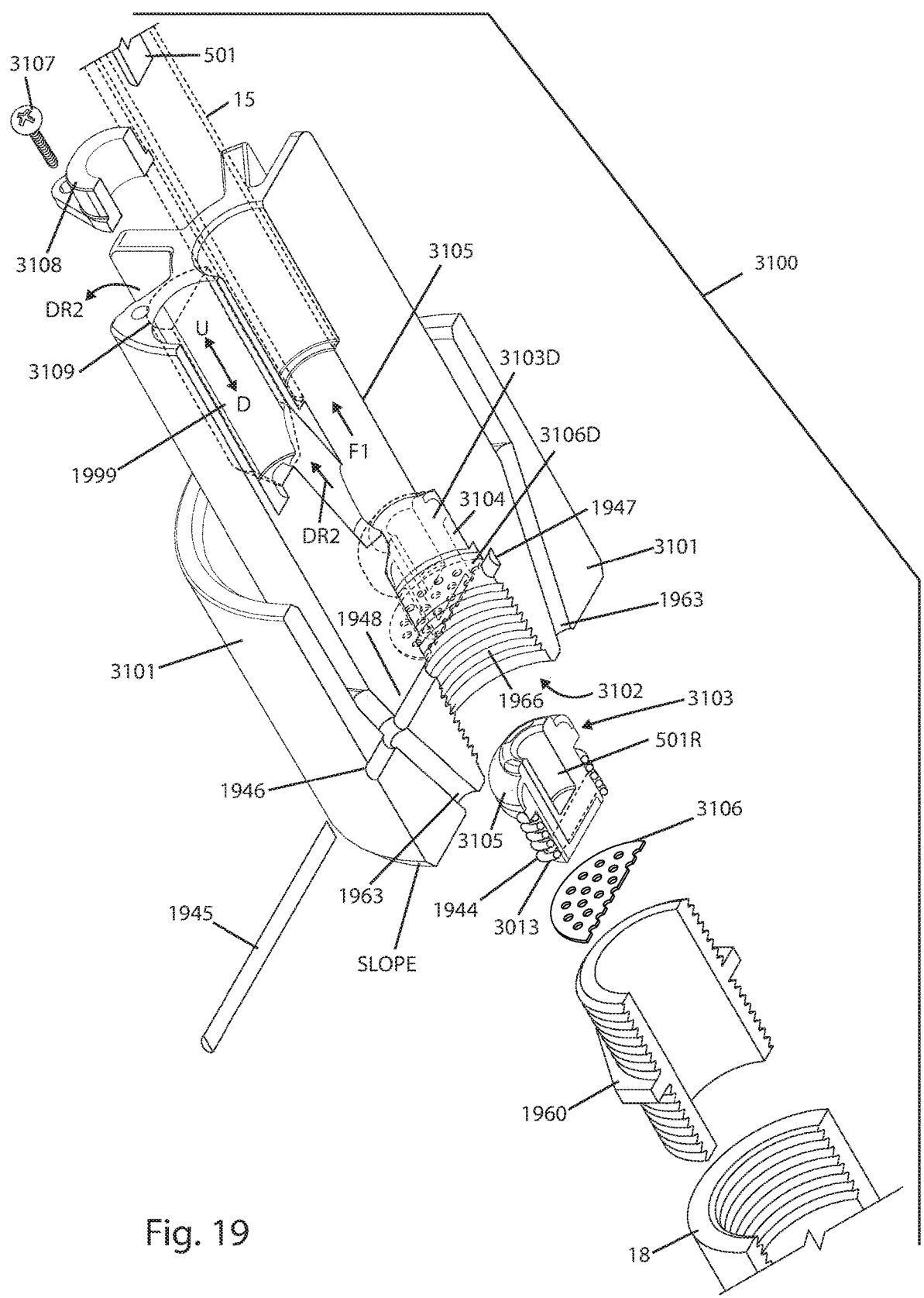
FIG. 19 is a cross sectional exploded view of a new valve assembly.
Figure 20:
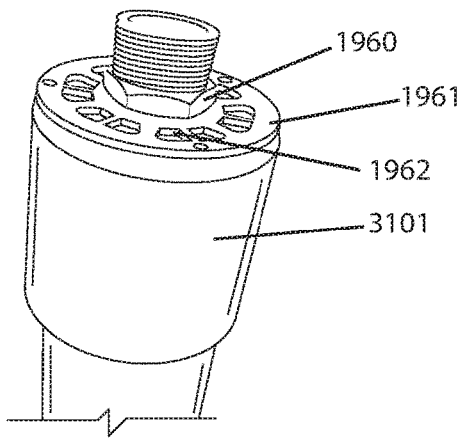
FIG. 20 is a top perspective view of the valve body with a metal female receiving fitting.

Referring next to FIG. 19 an improved valve 3100 comprises a base 3101 that has a threaded female port 3102 to receive inlet pipe (not shown) with male threads. An optional metal adapter 1960 can be threaded into threads 1966 to accept pipe 18. A valve body 3103 (FIG. 23) fits into chamber 3104. A top 3105 of the valve body 3103 is resilient, for example made of rubber or plastic (Shore 20A-Shore 70A). A central hole 501R receives the central activation rod 501. When rod 501 is depressed via flapper 1704, the valve body 3103 is displaced downward shown by 3103D. Water flows F1 up the central channel 3105 and up pipe 15. A screen 3106 is secured under the valve body 3103 by metal rod 1945 which fits into hole 1946, channel 1948 and stop hole 1947. A screw 3107 secures cap 3108 to the top 3109 of the base 3101. Drain passage DR2 allows water in pipe 15 to escape when valve 3103 is shut. A metal plug 1999 prevents city water from escape when valve 3103 is open. Spring 1944 urges valve 3103 closed.

The bottom of valve body 3101 is sloped down SLOPE with larger drain holes 1963 at least 0.25 inch by 0.25 inch wide.

Figure 22:
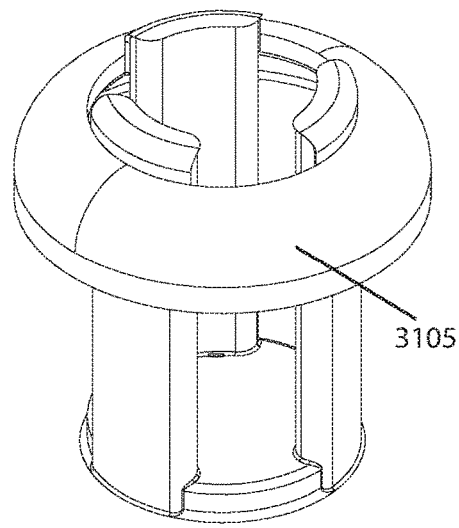
FIG. 22 is a side perspective view of the soft overmolded valve top.
Figure 21:
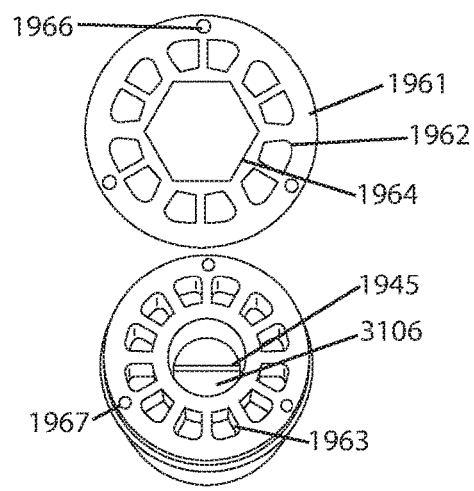
FIG. 21 is a top perspective view of the new adjustment plate to accomate the metal female receiving fitting.
Figure 23:
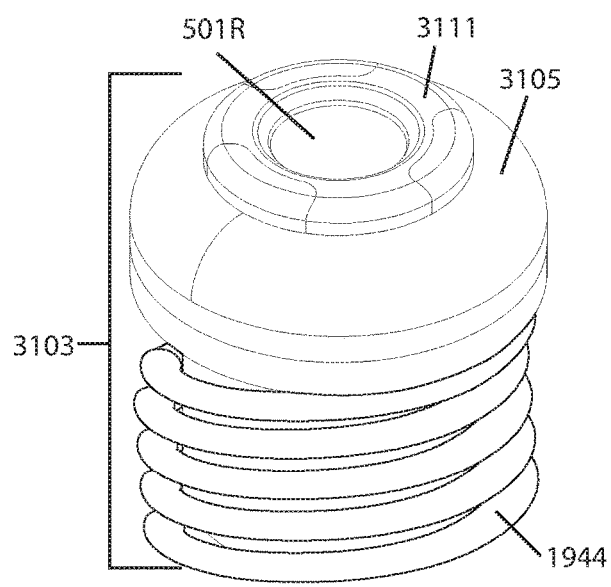
FIG. 23 is a side perspective view of the valve final assembly.

Referring next to FIGS. 22,23 the valve body 3103 is made from a two mold method. A first hard inner core 3111 is molded. Then a softer material is overmolded over it to make the top 3105.

Figure 24:
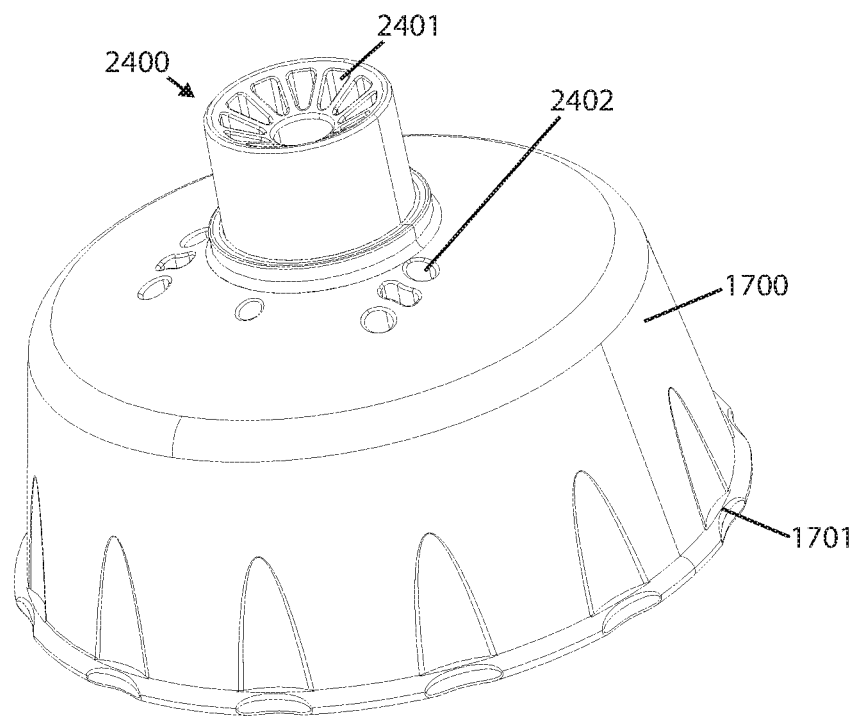
FIG. 24 is a bottom perspective view of the bowl.

Referring next to FIG. 24 the bowl 1700 has a bottom collar 2400 that has a concave guide 2401 to easily receive the ½ inch pipe 15 to guide for ease of assembly and repair. The screw holes 2402 receive bolts 1716 of FIG. 17A. These screw holes 2402 go through the bottom of bowl 1700 to allow ice or slush to be pushed out and not block the bolt 1716.

While a number of exemplifying features and embodiments have been discussed above, those of skill in the art will recognize certain modifications, permutations, additions and subcombinations thereof. No limitation with respect to the specific embodiments disclosed herein is intended or should be inferred.

The invention claimed is:

1. An animal watering fountain comprising:
   a water holding bowl;
   a vertical support pipe for said bowl comprising a tubular member having a coaxial water-carrying conduit therein, and where an annular interspace is defined between the tubular member and the conduit, and wherein the conduit is in communication with a central bottom hole of the water bowl;
   a first valve interconnecting the conduit and a source of water;
   a reciprocable actuator rod attached to the first valve and disposed within the water carrying conduit;
   said reciprocable actuator rod extending through the central bottom hole and protruding above the bottom hole;
   a depressable flapper pivotally mounted within the bowl and in operable contact with the reciprocal actuator rod;
   said first valve further comprising a first drain comprising a drain valve to drain water from the coaxial water-carrying conduit when the first valve means is closed;

a second valve allowing a drainage of the water-carrying conduit;

a second drain comprising a plurality of top bowl indents which allow water to drain between the top of bowl indents and the vertical support pipe into the annular interspace; and wherein the water holding bowl is mounted at or below a top of the vertical support pipe.

2. The animal watering fountain of claim 1, wherein the depressible flapper further comprises a lower body pivot mount assembly comprising a left and a right outer arm each having an axle hole, a landings space from each outer arm to a lower central tongue, said lower central tongue having an axle hole, a left and a right landing attached to a bottom of the bowl, a metal axle received by all the axle holes, said metal axle received in a groove in each landing, and a landing cap removably secured over each landing to clamp the metal axle.

3. The animal watering fountain of claim 2, wherein the lower central tongue further comprises a threaded stopper to adjustably engage a bottom stopper post.

4. The animal watering fountain of claim 3, wherein the flapper further comprises a pressure point foot adjacent the lower central tongue on a bottom of the flapper, facing distally, wherein the pressure point foot engages the reciprocal actuator rod, wherein depressing an action end of the flapper opposite the lower central tongue depresses the reciprocal actuator rod.

5. The animal watering fountain of claim 4, wherein a flapper main body rises from the lower central tongue at an angle ranging from about 10° to about 80°, and the action end of the flapper does not extend outside an upper top end of the bowl.

6. The animal watering fountain of claim 5, wherein the action end of the flapper further comprises a removable training dome.

7. The animal watering fountain of claim 5, wherein the bowl further comprises a bottom collar having a concave receiving guide for the water-carrying conduit.

8. The animal watering fountain of claim 5, wherein the first valve further comprises a mushroom shaped movable valve head having a hard core center to receive the reciprocal actuator rod and a soft water sealing top that is spring biased against an inner city water port in a main valve body.

9. The animal watering fountain of claim 8 further comprising an inlet filter under the first valve, said inlet filter secured by a removable transverse rod in the main valve body.

10. The animal watering fountain of claim 8, wherein the main valve body further comprises a mounting flange to accept a metal female fitting to screw into a female hole in the main valve body.

11. An animal watering fountain comprising:

a water holding bowl;

a vertical support pipe for said bowl comprising a tubular member having a coaxial water-carrying conduit therein, and where an annular interspace is defined between the tubular member and the conduit, and wherein the conduit is in communication with a central bottom hole of the water bowl;

a first valve interconnecting the conduit and a source of water;

a reciprocable actuator rod attached to the first valve and disposed within the water carrying conduit;

said reciprocable actuator rod extending through the central bottom hole and protruding above the bottom hole;

a depressable flapper pivotally mounted within the bowl and in operable contact with the reciprocal actuator rod;

said first valve further comprising a first drain comprising a drain valve to drain water from the coaxial water-carrying conduit when the first valve is closed;

a second valve allowing a drainage of the water-carrying conduit; and wherein the depressible flapper further comprises a lower body pivot mount assembly comprising a left and a right outer arm each having an axle hole, a landings space from each outer arm to a lower central tongue, said lower central tongue having an axle hole, a left and a right landing attached to a bottom of the bowl, a metal axle received by all the axle holes, said metal axle received in a groove in each landing, and a landing cap removably secured over each landing to clamp the metal axle.

12. The animal watering fountain of claim 11, wherein the lower central tongue further comprises a threaded stopper to adjustably engage a bottom stopper post.

13. The animal watering fountain of claim 12, wherein the flapper further comprises a pressure point foot adjacent the lower central tongue on a bottom of the flapper, facing distally, wherein the pressure point foot engages the reciprocal actuator rod, wherein depressing an action end of the flapper opposite the lower central tongue depresses the reciprocal actuator rod.

14. The animal watering fountain of claim 13, wherein a flapper main body rises from the lower central tongue at an angle ranging from about 10° to about 80°, and the action end of the flapper does not extend outside an upper top end of the bowl.

15. The animal watering fountain of claim 14, wherein the action end of the flapper further comprises a removable training dome.

16. The animal watering fountain of claim 15, wherein the bowl further comprises a bottom collar having a concave receiving guide for the water-carrying conduit.

17. The animal watering fountain of claim 11, wherein the first valve further comprises a mushroom shaped movable valve head having a hard core center to receive the reciprocal actuator rod and a soft water sealing top that is spring biased against an inner city water port in a main valve body.

18. The animal watering fountain of claim 17 further comprising an inlet filter under the first valve, said inlet filter secured by a removable transverse rod in the main valve body.

19. The animal watering fountain of claim 18, wherein the main valve body further comprises a mounting flange to accept a metal female fitting to screw into a female hole in the main valve body.

20. An animal watering fountain comprising:

a water holding bowl;

a vertical support pipe for said bowl comprising a tubular member having a coaxial water-carrying conduit therein, and where an annular interspace is defined between the tubular member and the conduit, and wherein the conduit is in communication with a central bottom hole of the water bowl;

a first valve interconnecting the conduit and a source of water;

a reciprocable actuator rod attached to the first valve and disposed within the water carrying conduit;

said reciprocable actuator rod extending through the central bottom hole and protruding above the bottom hole;

a depressable flapper pivotally mounted within the bowl and in operable contact with the reciprocal actuator rod;

said first valve further comprising a first drain comprising a drain valve to drain water from the coaxial water-carrying conduit when the first valve is closed;

wherein the depressible flapper further comprises a lower body pivot mount assembly comprising a left and a right outer arm each having an axle hole, a landings space from each outer arm to a lower central tongue, said lower central tongue having an axle hole, a left and a right landing attached to a bottom of the bowl, a metal axle received by all the axle holes, said metal axle received in a groove in each landing, and a landing cap removably secured over each landing to clamp the metal axle;

the lower central tongue further comprises a threaded stopper to adjustably engage a bottom stopper post; and wherein the flapper further comprises a pressure point foot adjacent the lower central tongue on a bottom of the flapper, facing distally, wherein the pressure point foot engages the reciprocal actuator rod, wherein depressing an action end of the flapper opposite the lower central tongue depresses the reciprocal actuator rod.

\* \* \* \* \*